(12) United States Patent
Enomoto et al.

(10) Patent No.: US 7,991,539 B2
(45) Date of Patent: Aug. 2, 2011

(54) ENGINE CONTROLLER

(75) Inventors: Hiroshi Enomoto, Toyota (JP); Atsushi Morikawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 196 days.

(21) Appl. No.: 12/523,927

(22) PCT Filed: May 21, 2008

(86) PCT No.: PCT/JP2008/059310
§ 371 (c)(1),
(2), (4) Date: Jul. 21, 2009

(87) PCT Pub. No.: WO2008/143274
PCT Pub. Date: Nov. 27, 2008

(65) Prior Publication Data
US 2010/0108045 A1   May 6, 2010

(30) Foreign Application Priority Data
May 21, 2007   (JP) ................................ 2007-134281

(51) Int. Cl.
F02D 41/14    (2006.01)
G06F 19/00    (2011.01)
F02B 33/44    (2006.01)

(52) U.S. Cl. .......... 701/109; 123/488; 123/674; 60/607; 701/115

(58) Field of Classification Search ................. 123/674, 123/677, 703, 198 DB, 325, 481, 694, 695, 123/486, 488; 701/109, 115; 60/276, 286, 60/607, 608, 605.2
See application file for complete search history.

(56) References Cited

U.S. PATENT DOCUMENTS

| | | | | |
|---|---|---|---|---|
| 4,434,759 A | * | 3/1984 | Iezuka et al. | 123/325 |
| 5,638,800 A | * | 6/1997 | Furuya et al. | 123/674 |
| 5,941,211 A | * | 8/1999 | Brehob et al. | 123/325 |
| 6,148,808 A | * | 11/2000 | Kainz | 123/673 |
| 6,571,550 B2 | * | 6/2003 | Rosel et al. | 60/285 |
| 7,069,910 B2 | * | 7/2006 | Surnilla et al. | 123/481 |
| 7,096,663 B2 | * | 8/2006 | Mitsutani | 60/285 |
| 7,367,330 B2 | * | 5/2008 | Yoshidome | 123/672 |
| 2004/0060535 A1 | * | 4/2004 | Osawa et al. | 123/198 DB |
| 2004/0265658 A1 | * | 12/2004 | de Vaal et al. | 429/22 |
| 2008/0154481 A1 | * | 6/2008 | Stroia et al. | 701/109 |

FOREIGN PATENT DOCUMENTS

| | | |
|---|---|---|
| EP | 1 333 171 A | 8/2003 |
| JP | 05-202816 A | 8/1993 |
| JP | 06-207522 A | 7/1994 |
| JP | 10-212999 A | 8/1998 |

(Continued)

*Primary Examiner* — Willis R Wolfe, Jr.
*Assistant Examiner* — Johnny H Hoang
(74) *Attorney, Agent, or Firm* — Sughrue Mion, PLLC

(57) ABSTRACT

An electronic control unit 50 determines whether the ambient air in the vicinity of an oxygen concentration sensor 55 in an exhaust passage 30 has become equal to the atmospheric state as a fuel cut-off operation is executed. If the ambient air in the vicinity of the oxygen concentration sensor 55 is equal to the atmospheric state, the electronic control unit 50 executes a learning process, in which a detection value C of the oxygen concentration sensor 55 is stored as a learned value Cstd in a memory 56. The electronic control unit 50 continues the learning process until a predetermined time period set based on an exhaust gas transport delay elapses from when the fuel cut-off operation is terminated.

5 Claims, 9 Drawing Sheets

30-Exhaust Passage
50-Electronic Control Unit
55-Oxygen Concentration Sensor
56-Memory

FOREIGN PATENT DOCUMENTS

| | | |
|---|---|---|
| JP | 2003-003903 A | 1/2003 |
| JP | 2003-172179 A | 6/2003 |
| JP | 2003-214245 A | 7/2003 |
| JP | 2004-346778 A | 12/2004 |
| JP | 2005-105834 A | 4/2005 |
| JP | 2007-092622 A | 4/2007 |

* cited by examiner

ENGINE CONTROLLER

FIELD OF THE INVENTION

The present invention relates to an engine controller that includes an oxygen concentration sensor located in an exhaust passage. The oxygen concentration sensor detects the concentration of oxygen in exhaust gas.

BACKGROUND OF THE INVENTION

A typical gasoline engine executes air-fuel ratio feedback control to correct fuel injection amount based on a detection value from the oxygen concentration sensor located in the exhaust passage. To improve the exhaust gas property, diesel engines have been proposed that are configured to control exhaust gas recirculation amount by an exhaust gas recirculation mechanism, that is, an EGR mechanism based on the oxygen concentration of exhaust gas detected by the oxygen concentration sensor located in the exhaust passage.

However, as shown in FIG. 9, the actual output property of the oxygen concentration sensor, that is, the relationship between the oxygen concentration and a detection value C can deviate from the standard output property due to time degradation, activated state, or individual differences of sensor elements. If variation occurs in the output property of the oxygen concentration sensor as described above, the oxygen concentration in the exhaust gas cannot be detected accurately. In this case, the air-fuel ratio and the exhaust gas recirculation amount are controlled based on the detection value C of low precision.

Patent Document 1 discloses a learning device, which determines that the oxygen concentration of the ambient air in the vicinity of the oxygen concentration sensor is substantially equal to the oxygen concentration of the atmospheric air on condition that the fuel injection has been stopped for a predetermined time period, and stores the detection value C of the oxygen concentration sensor at the time as a learned value Cstd. More specifically, when it is predicted that the oxygen concentration in the vicinity of the oxygen concentration sensor will become equal to the oxygen concentration of the atmospheric air (atmospheric oxygen concentration Datm shown in FIG. 9) since the deceleration state that involves fuel cut-off operation has been continued for a predetermined time period and the air drawn into the engine is fed unchanged to the exhaust passage, the learning device stores the detection value C of the oxygen concentration sensor at the time as the learned value Cstd. Thereafter, the learning device corrects the detection value C of the oxygen concentration sensor based on the stored learned value Cstd. An example of such correction includes a method in which a detection value corresponding to the atmospheric oxygen concentration Datm according to the standard output property is previously stored as a reference value Cnrm, and the detection value C of the oxygen concentration sensor is multiplied by a correction coefficient K, which is a value Cnrm/Cstd obtained by dividing the reference value Cnrm by the learned value Cstd.

Thus, even if variation occurs in the detection value C due to, for example, time degradation and individual differences, deterioration of the exhaust gas property is inhibited by executing the learning process, in which the detection value C at the time when the ambient air in the vicinity of the oxygen concentration sensor is equal to the atmospheric state is stored as the learned value Cstd, and correcting the detection value C of the oxygen concentration sensor based on the stored learned value Cstd.

However, the time period during which the fuel cut-off operation is continued during travelling of the vehicle is relatively short. Thus, the learning process cannot be completed when the fuel cut-off operation is terminated before the ambient air in the vicinity of the oxygen concentration sensor becomes equal to the atmospheric state. Thus, the state in which the learned value Cstd cannot be obtained is continued for a long period of time in the conventional configuration, and the air-fuel ratio and the exhaust gas recirculation amount are not precisely controlled.

Patent Document 1: Japanese Laid-Open Patent Publication No. 10-212999

SUMMARY OF THE INVENTION

Accordingly, it is an objective of the present invention to provide an engine controller that increases chances for obtaining a learned value in a learning process for learning a reference value of an oxygen concentration sensor, and inhibits deterioration of exhaust gas property due to variation of detection values of the oxygen concentration sensor.

To achieve the above objective, a first aspect of the present invention provides an engine controller comprising an oxygen concentration sensor and learning means. The oxygen concentration sensor is located in an exhaust passage and detects the oxygen concentration of exhaust gas. The learning means executes a learning process for determining whether ambient air in the vicinity of the oxygen concentration sensor in the exhaust passage has become equal to the oxygen concentration of atmospheric air as a fuel cut-off operation is executed, and stores, as a learned value, a detection value of the oxygen concentration sensor at the time when the ambient air in the vicinity of the oxygen concentration sensor is determined to be equal to the atmospheric state. The learning means corrects a detection value of the oxygen concentration sensor based on the learned value. The learning means continues the learning process until a predetermined time period set based on an exhaust gas transport delay elapses from when the fuel cut-off operation is terminated.

A certain time is needed for the exhaust gas fed to the exhaust passage from the combustion chambers to reach the vicinity of the oxygen concentration sensor. Thus, an exhaust gas transport delay occurs even after the termination of the fuel cut-off operation until the burned gas reaches the vicinity of the oxygen concentration sensor. The exhaust gas transport delay is caused based on the fact that the air drawn into the engine during the fuel cut-off operation and fed unchanged to the exhaust passage flows. In this respect, according to the above configuration, the learning process is continued until the predetermined time period based on the exhaust gas transport delay elapses from when the fuel cut-off operation is terminated. Thus, the length of the time period for determining whether the ambient air in the vicinity of the oxygen concentration sensor is equal to the atmospheric air is increased as compared to a conventional method in which the learning process is terminated when the fuel cut-off operation is terminated. Thus, even if the time period for the fuel cut-off operation is short, the frequency of determining that the ambient air in the vicinity of the oxygen concentration sensor is equal to the atmospheric state in the above-mentioned determination is increased. As a result, chances for obtaining the learned value in the learning process are increased, inhibiting deterioration of the exhaust gas property due to the variation of the detection value of the oxygen concentration sensor.

In the above-mentioned engine controller, when deviation between a reference value, which is previously set as an output value of the oxygen concentration sensor at the time when the ambient air in the vicinity of the oxygen concentration sensor is equal to the atmospheric state, and an output value of the oxygen concentration sensor when the fuel cut-off operation is terminated is great, the learning means preferably prohibits the learning process based on the determination that the ambient air in the vicinity of the oxygen concentration sensor is equal to the atmospheric state during the predetermined time period.

Even if the oxygen concentration sensor has a standard output property, the responsiveness might significantly decrease due to, for example, temperature decrease of a sensor element, and the output property of the oxygen concentration sensor might temporarily differ from the standard output property. The learned value obtained under such circumstance has low reliability and the correction precision of the detection value is also reduced.

In this respect, according to the above configuration, when the deviation between the reference value, which is previously set as the output value of the oxygen concentration sensor, and the detection value of the oxygen concentration sensor when the fuel cut-off operation is terminated is great, the learning means determines that the output property of the oxygen concentration sensor is temporarily varied due to some factors and prohibits the learning process. Therefore, the detection value of the oxygen concentration sensor is prevented from being corrected based on the learned value of low reliability.

In the above-mentioned engine controller, when an integrated exhaust flow rate from when the fuel cut-off operation is terminated becomes greater than a determination amount, the learning means preferably determines that the predetermined time period based on the exhaust gas transport delay has elapsed.

As the flow rate of exhaust gas that flows in the exhaust passage is increased after the fuel cut-off operation is terminated, the time taken for the burned gas to reach the vicinity of the oxygen concentration sensor is reduced, which shortens the time period corresponding to the exhaust gas transport delay. Thus, by computing the integrated exhaust flow rate from when the fuel cut-off operation is terminated, the learning means determines that the predetermined time period based on the exhaust gas transport delay has elapsed based on the fact that the integrated exhaust flow rate has become greater than the determination amount.

The integrated exhaust flow rate is computed based on the integrated value of the intake air amount of the internal combustion engine. Also, even if the flow rate of exhaust gas flowing in the exhaust passage does not change, the time taken for the burned gas to reach the vicinity of the oxygen concentration sensor after the fuel cut-off operation is terminated changes in accordance with the length and shape of the exhaust passage from the combustion chambers to the oxygen concentration sensor or the cross-sectional area of the passage. Thus, the determination amount is preferably set taking into consideration the specification of the exhaust passage.

In the above-mentioned engine controller, when the integrated exhaust flow rate from when the fuel cut-off operation is started becomes greater than a predetermined amount, the learning means preferably determines that the ambient air in the vicinity of the oxygen concentration sensor is equal to the atmospheric state.

When the amount of air that is drawn into the engine and fed unchanged to the exhaust passage as the fuel cut-off operation is performed is increased, the time taken for the ambient air in the vicinity of the oxygen concentration sensor to be equal to the atmospheric state is reduced. Thus, the learning means determines that the ambient air in the vicinity of the oxygen concentration sensor is equal to the atmospheric state based on the fact that the integrated exhaust flow rate from when the fuel cut-off operation is started has become greater than the predetermined amount.

The time taken for the ambient air in the vicinity of the oxygen concentration sensor to become equal to the atmospheric state from when the fuel cut-off operation is started changes in accordance with the length and shape of the exhaust passage from the combustion chambers to the oxygen concentration sensor, or the cross-sectional area of the exhaust passage. Thus, the predetermined amount is preferably set based on the specification of the exhaust passage.

In the above-mentioned engine controller, when the integrated exhaust flow rate from when the fuel cut-off operation is started to when the fuel cut-off operation is terminated is less than a predetermined reference amount, the learning means preferably prohibits the learning process.

If the ambient air in the vicinity of the oxygen concentration sensor has not approached the atmospheric state by a certain amount when the fuel cut-off operation is terminated, the learning process cannot be completed within the time period required for the fuel to reach the oxygen concentration sensor, that is, the time period corresponding to the exhaust gas transport delay, even if the learning process is continued after the fuel cut-off operation is terminated. According to the above configuration, the learning means prohibits the learning process when the integrated exhaust flow rate from when the fuel cut-off operation is started to when the fuel cut-off operation is terminated is less than the predetermined reference value. Thus, the learning means determines, at the time when the fuel cut-off operation is terminated, whether the learning can be completed by continuing the subsequent learning process, and executes the learning process in accordance with the possibility.

The predetermined reference value for determining, at the time when the fuel cut-off operation is terminated, whether the learning can be completed by continuing the subsequent learning process changes in accordance with the length and shape of the exhaust passage from the combustion chambers to the oxygen concentration sensor, or the cross-sectional area of the exhaust passage. Thus, the predetermined reference value is preferably set based on the specification of the exhaust passage.

In the above-mentioned engine controller, the engine preferably includes a motor assisted turbocharger, which is selectively driven by a motor. The motor assisted turbocharger is preferably driven by the motor during execution of the fuel cut-off operation so that air is forcibly fed to the exhaust passage.

Furthermore, the engine controller includes a motor assisted turbocharger, an oxygen concentration sensor, determining means, and learning means. The motor assisted turbocharger is selectively driven by a motor. The oxygen concentration sensor is located in an exhaust passage and detects oxygen concentration of exhaust gas. The determining means determines that the ambient air in the vicinity of the oxygen concentration sensor is equal to the atmospheric state when the time period from when a fuel cut-off operation is started to when the fuel cut-off operation is terminated is greater than or equal to a predetermined time period. The learning means drives the motor assisted turbocharger by the motor to forcibly feed air to the exhaust passage. When the ambient air in the vicinity of the oxygen concentration sensor is determined to be equal to the atmospheric state by the determining means, the learning means executes a learning process for storing a detection value detected by the oxygen concentration sensor as a learned value. The learning means preferably corrects a detection value of the oxygen concentration sensor based on the learned value.

According to the above configuration, during execution of the fuel cut-off operation, the motor assisted turbocharger is driven by the motor to forcibly feed air to the exhaust passage. Thus, the mount of air flowing through the exhaust passage is increased. This reduces the time taken for the ambient air in the vicinity of the oxygen sensor to become equal to the atmospheric air. Therefore, chances for obtaining the learned value in the learning process are further increased, inhibiting deterioration of the exhaust gas property due to variation of the detected value of the oxygen concentration sensor.

Furthermore, even in the case where the ambient air in the vicinity of the oxygen concentration sensor is determined to be equal to the atmospheric state when the time period from when the fuel cut-off operation is started to when the fuel cut-off operation is terminated is greater than or equal to the predetermined time period as in the conventional configuration, chances that the ambient air is determined to be equal to the atmospheric state is increased by forcibly feeding air to the exhaust passage.

The time period from when the fuel cut-off operation is started to when the ambient air in the vicinity of the oxygen concentration sensor becomes equal to the atmospheric state changes in accordance with the length and shape of the exhaust passage from the combustion chambers to the oxygen concentration sensor or the cross-sectional area of the exhaust passage. Thus, the time period for determining whether the ambient air in the vicinity of the oxygen concentration sensor in the exhaust passage is equal to the atmospheric state is preferably set based on the specification of the exhaust passage.

DETAILED DESCRIPTION OF THE PREFERRED EMBODIMENTS

First Embodiment

An engine controller according to a first embodiment of the present invention will now be described with reference to FIGS. 1 to 3. The controller of the first embodiment is applied to a diesel engine.

Figure 1:
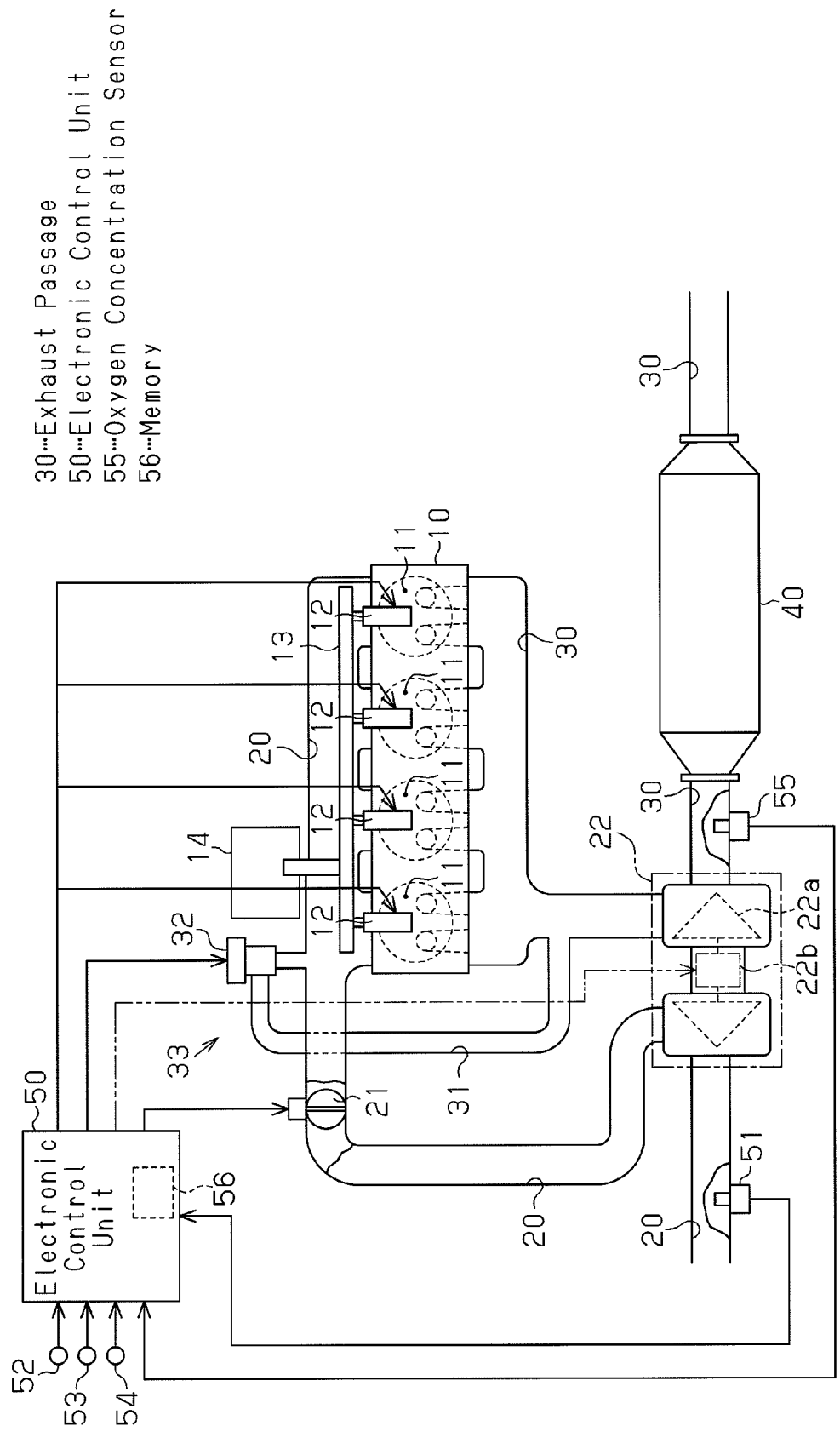
FIG. 1 is a schematic diagram illustrating the structure of a diesel engine according to a first embodiment of the present invention.
Figure 2:
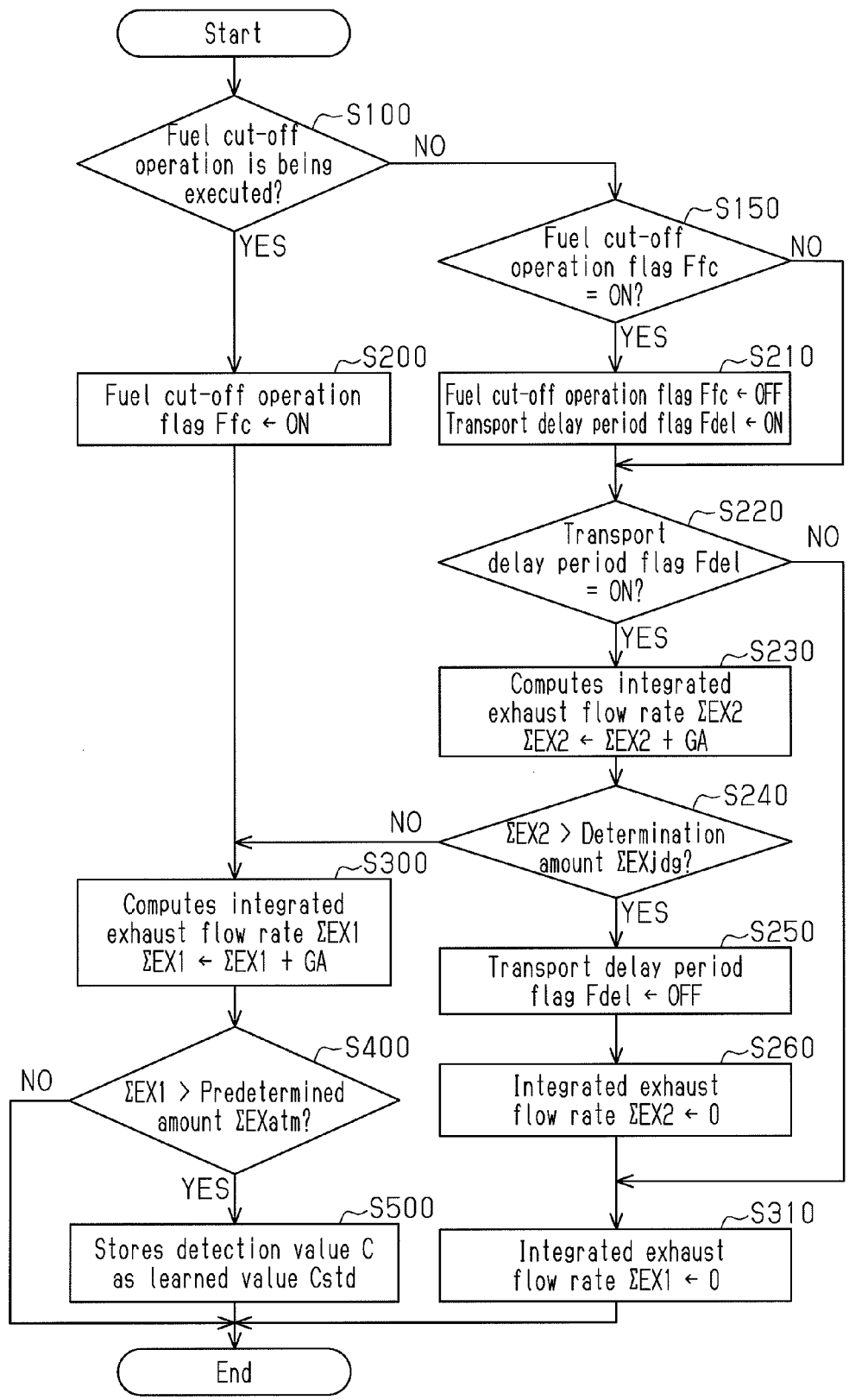
FIG. 2 is a flowchart showing a series of steps of a learning process.

As shown in FIG. 1, an intake passage 20 and an exhaust passage 30 are connected to an engine main body 10. An intake throttle valve 21, which is selectively opened and closed by a motor, is provided in the intake passage 20. The amount of air introduced into combustion chambers 11 is adjusted by changing the opening degree of the intake throttle valve 21.

Injectors 12, which inject fuel, are provided in the combustion chambers 11 of the engine main body 10 such that each injector 12 corresponds to one of cylinders. The injectors 12 are connected to a common rail 13. Fuel that is supplied to the common rail 13 is injected into the combustion chambers 11 from the injectors 12. Fuel that is pressurized by a supply pump 14 is supplied to the common rail 13.

The intake passage 20 and the exhaust passage 30 are connected to a turbocharger 22. The turbocharger 22 pressurizes the air in the intake passage 20 and forcibly feeds the pressurized air into the combustion chambers 11 by rotating a turbine 22a by energy of exhaust gas that flows through the exhaust passage 30.

A catalyst converter 40 is provided in the exhaust passage 30. The catalyst converter 40 is configured by an oxidation catalyst, which oxidizes hydrocarbon (HC) and carbon monoxide (CO) in the exhaust gas, and a filter, which traps particulate matter, which is predominantly composed of soot in exhaust gas. The filter is formed by porous material. The exhaust gas introduced into the catalyst converter 40 is purified by the oxidation catalyst to remove HC and CO, and discharged into the atmospheric air after the particulate matter is trapped by the filter.

An exhaust gas reflux passage 31, which returns part of the exhaust gas in the exhaust passage 30 to the intake passage 20, is connected upstream of the turbocharger 22 in the exhaust passage 30. A control valve that is selectively opened and closed by a linear solenoid, which is an EGR valve 32 in this embodiment, is located in the exhaust gas reflux passage 31. The amount of the exhaust gas that is returned from the exhaust passage 30 to the intake passage 20 is adjusted by changing the opening degree of the EGR valve 32. The exhaust gas reflux passage 31 and the EGR valve 32 configure an exhaust gas recirculation mechanism, that is, an EGR mechanism 33.

Opening and closing control of the EGR valve 32 and the intake throttle valve 21, and fuel injection control through the injectors 12 are performed by an electronic control unit 50, which executes various types of control of the diesel engine. Various types of sensors, which detect the engine operating condition and the vehicle driving state are connected to the electronic control unit 50. The sensors include an air flowmeter 51, which detects the intake air amount GA, a rotational speed sensor 52, which detects the engine rotation speed NE, a vehicle speed sensor 53, which detects the vehicle speed V, an acceleration pedal sensor 54, which detects the acceleration pedal depression amount ACCP by a driver. The electronic control unit 50 receives detection signals from the various types of sensors. An oxygen concentration sensor 55 is mounted upstream of the catalyst converter 40 in the exhaust passage 30. The oxygen concentration sensor 55 is a limiting current sensor, which outputs a current value that increases in proportion to the oxygen concentration of the exhaust gas that contacts the sensor element. The electronic control unit 50 also receives a detection value C of the oxygen concentration sensor 55.

The electronic control unit 50 computes based on detection signals from various types of sensors 51 to 55, and controls various parts of the engine. The electronic control unit 50 includes a memory 56, which stores various types of flags set through the computation and computation results.

The electronic control unit 50 computes a target fuel injection amount based on, for example, the acceleration pedal depression amount ACCP corresponding to the detected vehicle speed V or the engine rotation speed NE, and generates engine torque in response to the driver's request. The electronic control unit 50 controls the injectors 12 such that the fuel injection amount matches the target fuel injection amount.

If the amount of oxygen introduced into the combustion chambers 11 becomes excessive for the fuel injection amount, the amount of nitrogen oxide generated by the engine combustion is increased. Thus, the electronic control unit 50 estimates the excessiveness of oxygen introduced into the combustion chambers 11 based on the detection value C of the oxygen concentration sensor 55, and controls the opening degree of the intake throttle valve 21 and the EGR valve 32 in accordance with the estimation to return part of the exhaust gas into the combustion chambers 11. Thus, the amount of oxygen introduced into the combustion chambers 11 is reduced, and generation of nitrogen oxide is inhibited by returning part of the exhaust gas to the combustion chambers 11.

However, the actual output property of the oxygen sensor concentration 55, that is, the relationship between the oxygen concentration and the corresponding detection value C might deviate from the average property due to time degradation, activated state, or individual differences of sensor elements. If the output property of the oxygen concentration sensor 55 varies in this manner, the oxygen concentration of exhaust gas is not accurately detected. In this case, the air-fuel ratio and the exhaust gas recirculation amount are controlled based on the detection value C of low precision. Thus, the EGR mechanism 33 is not precisely controlled, and the exhaust gas property might deteriorate.

In the present embodiment, the electronic control unit 50 determines that the oxygen concentration of the ambient air in the vicinity of the oxygen concentration sensor 55 has become substantially equal to that of the atmospheric air as a fuel cut-off operation has been executed during engine operation, and executes a learning process in which the current detection value C of the oxygen concentration sensor 55 is stored as a learned value Cstd in the memory 56. Thereafter, the electronic control unit 50 corrects the detection value C of the oxygen concentration sensor 55 based on the stored learned value Cstd. An example of such correction includes a method in which the detection value C corresponding to the atmospheric oxygen concentration Datm according to the standard output property is previously stored as a reference value Cnrm in the memory 56, and the detection value C of the oxygen concentration sensor 55 is multiplied by a correction coefficient K, which is a value Cnrm/Cstd obtained by dividing the reference value Cnrm by the learned value Cstd.

Thus, deterioration of the exhaust gas property is inhibited even if variation occurs in the detection value C due to time degradation or individual differences, by executing the learning process, in which the detection value C at the time when the ambient air in the vicinity of the oxygen concentration sensor 55 is equal to the atmospheric state is stored as the learned value Cstd, and correcting the detection value C based on the learned value Cstd.

A series of steps of the learning process will now be described with reference to the flowchart of FIG. 2. The process is repeatedly executed at a predetermined cycle by the electronic control unit 50 during engine operation.

When the process is started, the electronic control unit 50 first determines whether a fuel cut-off operation is being executed at step S100. If it is determined that the fuel cut-off operation is being executed (step S100: YES), the electronic control unit 50 proceeds to step S200, and sets a fuel cut-off operation flag Ffc to ON.

Then, the electronic control unit 50 proceeds to step S300, and computes an integrated exhaust flow rate $\Sigma EX1$. The integrated exhaust flow rate $\Sigma EX1$ is an integrated value of the intake air amount GA from when the fuel cut-off operation is started. The electronic control unit 50 computes a new integrated exhaust flow rate $\Sigma EX1$ by adding the intake air amount GA detected by the air flowmeter 51 at the time to the integrated exhaust flow rate $\Sigma EX1$ up to the previous control cycle.

After computing the integrated exhaust flow rate $\Sigma EX1$, the electronic control unit 50 proceeds to step S400, and determines whether the integrated exhaust flow rate $\Sigma EX1$ is greater than a predetermined amount $\Sigma EXatm$. The electronic control unit 50 determines that the oxygen concentration of the ambient air in the vicinity of the oxygen concentration sensor 55 is equal to the oxygen concentration of the atmospheric air based on the fact that the integrated exhaust flow rate $\Sigma EX1$ is greater than the predetermined amount $\Sigma EXatm$. The predetermined amount $\Sigma EXatm$ is set taking into consideration the length and shape of the exhaust passage 30 from the combustion chambers 11 to the oxygen concentration sensor 55, or the cross-sectional area of the passage.

If the integrated exhaust flow rate $\Sigma EX1$ is greater than the predetermined amount $\Sigma EXatm$ (step S400: YES), that is, if the ambient air in the vicinity of the oxygen concentration sensor 55 is equal to the atmospheric state, the electronic control unit 50 proceeds to step S500, and stores the current detection value C of the oxygen concentration sensor 55 as a new learned value Cstd in the memory 56. Then, the electronic control unit 50 temporarily suspends the routine.

If the integrated exhaust flow rate $\Sigma EX1$ is less than or equal to the predetermined amount $\Sigma EXatm$ (step S400: NO), that is, if the ambient air in the vicinity of the oxygen concentration sensor 55 has not yet become equal to the atmospheric state, the electronic control unit 50 skips step S500, and temporarily suspends the routine.

Also, if the fuel cut-off operation is not being executed (step S100: NO), the electronic control unit 50 proceeds to step S150, and determines whether the fuel cut-off operation flag Ffc is set to ON. If the fuel cut-off operation flag Ffc is set to OFF (step S150: NO), the electronic control unit 50 presumes that the fuel cut-off operation was also not executed in the previous control cycle. That is, the electronic control unit 50 presumes that normal fuel injection control has been continued. If the fuel cut-off operation flag Ffc is set to ON (step S150: YES), the electronic control unit 50 presumes that the fuel cut-off operation was executed in the previous control cycle, and that the fuel cut-off operation has just been terminated.

If the fuel cut-off operation flag Ffc is ON (step S150: YES), the electronic control unit 50 proceeds to step S210, and sets the fuel cut-off operation flag Ffc to OFF. Also, the electronic control unit 50 sets a transport delay period flag Fdel to ON, and then proceeds to step S220. The electronic control unit 50 refers to the above-mentioned transport delay period flag Fdel to determine whether it is the period of time in which the burned gas that is fed to the exhaust passage 30 in association with the termination of the fuel cut-off operation has not reached the vicinity of the oxygen concentration sensor 55. The transport delay period flag Fdel is set to ON immediately after the fuel cut-off operation is terminated, and is set to OFF when a predetermined time period that is set based on the exhaust gas transport delay elapses as described below.

If the fuel cut-off operation flag Ffc is OFF (step S150: NO), the electronic control unit 50 skips step S210 and proceeds to step S220.

In step S220, the electronic control unit 50 determines whether the transport delay period flag Fdel is ON. If the transport delay period flag Fdel is ON (step S220: YES), that is, if it is presumed that it is during the predetermined time period based on the exhaust gas transport delay, the electronic control unit 50 proceeds to step S230, and computes the integrated exhaust flow rate $\Sigma EX2$. The integrated exhaust flow rate $\Sigma EX2$ is an integrated value of the intake air amount GA from the termination of the fuel cut-off operation. In step S230, the electronic control unit 50 computes a new integrated exhaust flow rate $\Sigma EX2$ by adding the intake air amount GA detected by the air flowmeter 51 at the time to the integrated exhaust flow rate $\Sigma EX2$ up to the previous control cycle.

The electronic control unit 50 proceeds to step S240 after computing the integrated exhaust flow rate $\Sigma EX2$, and determines whether the integrated exhaust flow rate $\Sigma EX2$ is greater than a determination amount $\Sigma EXjdg$. The determination amount $\Sigma EXjdg$ is a value that determines the length of the predetermined time period based on the exhaust gas transport delay. In step S240, the electronic control unit 50 determines that the predetermined period based on the exhaust gas transport delay has elapsed based on the fact that the integrated exhaust flow rate $\Sigma EX2$ is greater than the determination amount $\Sigma EXjdg$. The determination amount $\Sigma EXjdg$ is set taking into consideration the distance from the combustion chambers 11 to the oxygen concentration sensor 55 and the shape of the exhaust passage 30, or the cross-sectional area of the passage, such that the predetermined time period is slightly shorter than the time period corresponding to the actual exhaust gas transport delay.

When the integrated exhaust flow rate $\Sigma EX2$ is less than or equal to the determination amount $\Sigma EXjdg$ (step S240: NO), that is, if the predetermined time period based on the exhaust gas transport delay has not yet elapsed, the electronic control unit 50 proceeds to step S300. The electronic control unit 50 proceeds to step S400 after computing the integrated exhaust flow rate $\Sigma EX1$, and determines whether the integrated exhaust flow rate $\Sigma EX1$ is greater than the predetermined amount $\Sigma EXatm$. If the integrated exhaust flow rate $\Sigma EX1$ is greater than the predetermined amount $\Sigma EXatm$ (step S400: YES), the electronic control unit 50 proceeds to step S500, and stores the detection value C of the oxygen concentration sensor 55 as the learned value Cstd in the memory 56, and temporarily suspends the routine. If the integrated exhaust flow rate $\Sigma EX1$ is still less than or equal to the predetermined amount $\Sigma EXatm$ (step S400: NO), the electronic control unit 50 skips step S500, and temporarily suspends the routine.

If the integrated exhaust flow rate $\Sigma EX2$ is greater than the determination amount $\Sigma EXjdg$ (step S240: YES), that is, if the predetermined time period based on the transport delay has elapsed, the electronic control unit 50 proceeds to step S250, and sets the transport delay period flag Fdel to OFF.

Then, the electronic control unit 50 proceeds to step S260, and resets the integrated exhaust flow rate $\Sigma EX2$ to 0. Then, the electronic control unit 50 proceeds to step 310, and resets the integrated exhaust flow rate $\Sigma EX1$ to 0, and temporarily suspends the routine.

If the transport delay period flag Fdel is OFF (step S220: NO), that is, if the predetermined time period based on the exhaust gas transport delay has already elapsed from the termination of the fuel cut-off operation, the electronic control unit 50 proceeds to step S310, and resets the integrated exhaust flow rate $\Sigma EX1$ to 0, and temporarily suspends the routine.

In the present embodiment, the electronic control unit 50 stores the detection value C of the oxygen concentration sensor 55 at the time when the ambient air in the vicinity of the oxygen concentration sensor 55 is equal to the atmospheric state as the learned value Cstd in the memory 56 by repeatedly executing the above-mentioned learning process during operation of the engine. Thereafter, the electronic control unit 50 corrects the detection value C of the oxygen concentration sensor 55 based on the stored learned value Cstd.

The operations of the above-mentioned learning process will now be described with reference to FIG. 3.

Figure 3:
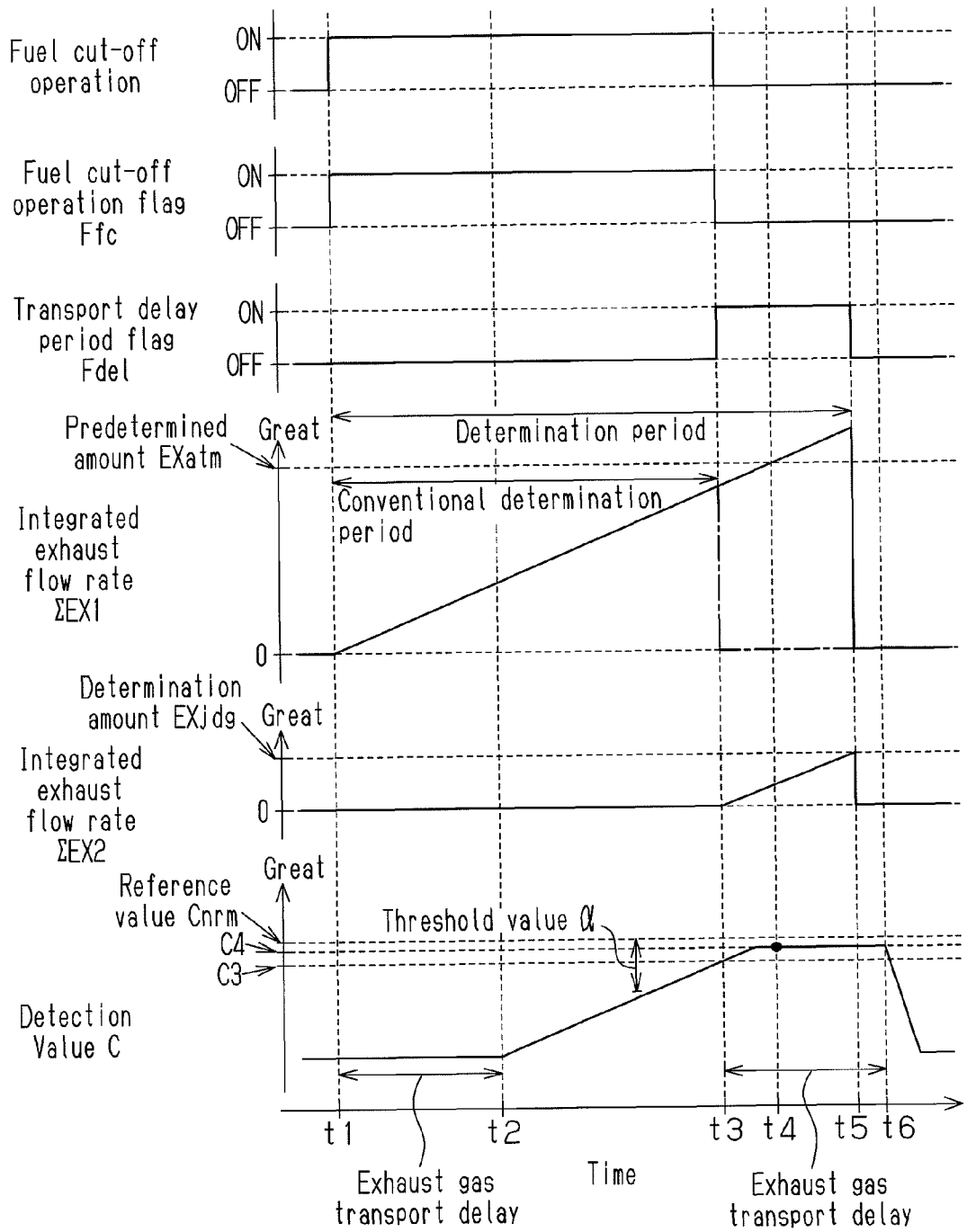
FIG. 3 is a timing chart showing the relationship between the time at which a learned value is acquired and the time at which a fuel cut-off operation is terminated in the learning process.

As shown in FIG. 3, when the fuel cut-off operation is executed at time t1, the fuel cut-off operation flag Ffc is set to ON, and computation of the integrated exhaust flow rate $\Sigma EX1$ is started. By the execution of the fuel cut-off operation, the air introduced into the combustion chambers 11 is fed unchanged to the exhaust passage 30. Accordingly, the oxygen concentration in the vicinity of the oxygen concentration sensor 55 gradually approaches the oxygen concentration of the atmospheric air. Thus, as the fuel cut-off operation is continued, the detection value C of the oxygen concentration sensor 55 increases. However, the air that is fed unchanged from the combustion chambers 11 to the exhaust passage 30 does not reach the vicinity of the oxygen concentration sensor 55 during the time period corresponding to the exhaust gas transport delay from time t1 to time t2 as shown in FIG. 3. That is, since the burned gas before starting the fuel cut-off operation is flowing in the vicinity of the oxygen concentration sensor 55, the detection value C of the oxygen concentration sensor 55 is kept at a low value and does not increase. After time t2, at which the time period corresponding to the exhaust gas transport delay has elapsed, the detection value C of the oxygen concentration sensor 55 gradually increases since the air that is introduced into the combustion chambers 11 and then fed unchanged to the exhaust passage 30 reaches the vicinity of the oxygen concentration sensor 55. Meanwhile, computation of the integrated exhaust flow rate $\Sigma EX1$ is continued, and the value of the integrated exhaust flow rate $\Sigma EX1$ is increased as the fuel cut-off operation is continued.

When the fuel cut-off operation is terminated at time t3, the fuel cut-off operation flag Ffc is set to OFF, and computation of the integrated exhaust flow rate $\Sigma EX2$ is started. In the conventional learning process, the electronic control unit 50 determines that the ambient air in the vicinity of the oxygen concentration sensor 55 is not equal to the atmospheric state if the integrated exhaust flow rate $\Sigma EX1$ is not greater than the predetermined amount $\Sigma EXatm$ at the termination of the fuel cut-off operation as shown by the dashed line in FIG. 3. The electronic control unit 50 then ends the learning process without obtaining the learned value Cstd.

In the present embodiment, the electronic control unit 50 continues computing the integrated exhaust flow rates $\Sigma EX1$ and $\Sigma GA2$ even after the fuel cut-off operation is terminated.

At time t4, when the integrated exhaust flow rate ΣEX1 becomes greater than the predetermined amount ΣEXatm, the electronic control unit 50 determines that the oxygen concentration of the ambient air in the vicinity of the oxygen concentration sensor 55 has become equal to the oxygen concentration of the atmospheric air, and stores the detection value C4 at this point in time as the learned value Cstd in the memory 56.

In conclusion, according to the present embodiment, the electronic control unit 50 continues the learning process during the time period from when the fuel cut-off operation is terminated (time t3) to when the integrated exhaust flow rate ΣEX2 becomes greater than the determination amount ΣEXjdg (time t5), that is, until the predetermined time period based on the exhaust gas transport delay elapses from the termination of the fuel cut-off operation as shown in FIG. 3. Then, when the integrated exhaust flow rate ΣEX1 becomes greater than the predetermined amount ΣEXatm during the determination time period from time t1, at which the fuel cut-off operation is started, to time t5, at which the integrated exhaust flow rate ΣEX2 becomes greater than the determination amount ΣEXjdg, the electronic control unit 50 stores the detection value C of the oxygen concentration sensor 55 as the learned value Cstd.

The burned gas that is fed to the exhaust passage 30 as the fuel cut-off operation is terminated reaches the vicinity of the oxygen concentration sensor 55 at time t6, at which the time period corresponding to the exhaust gas transport delay elapses as shown in FIG. 3. When the burned gas reaches the vicinity of the oxygen concentration sensor 55, the detection value C of the oxygen concentration sensor 55 is reduced. Thus, it is desirable to set the determination amount ΣEXjdg such that the predetermined time period based on the exhaust gas transport delay (time t3 to t5) becomes slightly shorter than the time period (time t3 to t6) corresponding to the actual exhaust gas transport delay to accurately detect the learned value Cstd.

The first embodiment has the following advantage.

(1) The learning process is continued until the predetermined time period set based on the exhaust gas transport delay elapses (time t5) from when the fuel cut-off operation is terminated (time t3). In this case, the time period for determining whether the ambient air in the vicinity of the oxygen concentration sensor 55 is equal to the atmospheric state is increased as compared to the conventional configuration in which the learning process ends with the termination of the fuel cut-off operation (time t3). Thus, even in the case where the fuel cut-off operation is performed for a short period of time, the number of times in which the ambient air in the vicinity of the oxygen concentration sensor 55 is determined to be equal to the atmospheric state is increased. As a result, chances for obtaining the learned value in the learning process are increased, inhibiting deterioration of the exhaust gas property caused by variation of the detection value C of the oxygen concentration sensor 55.

The first embodiment may be modified as follows.

When the fuel cut-off operation is terminated, the electronic control unit 50 compares the reference value Cnrm, which is previously set as an output value at the time when the ambient air in the vicinity of the oxygen concentration sensor 55 is equal to the atmospheric state, with the detection value C of the oxygen concentration sensor 55. If the deviation of the values is great, the electronic control unit 50 may prohibit the learning process based on the determination that the ambient air in the vicinity of the oxygen concentration sensor 55 is equal to the atmospheric state.

Figure 4:
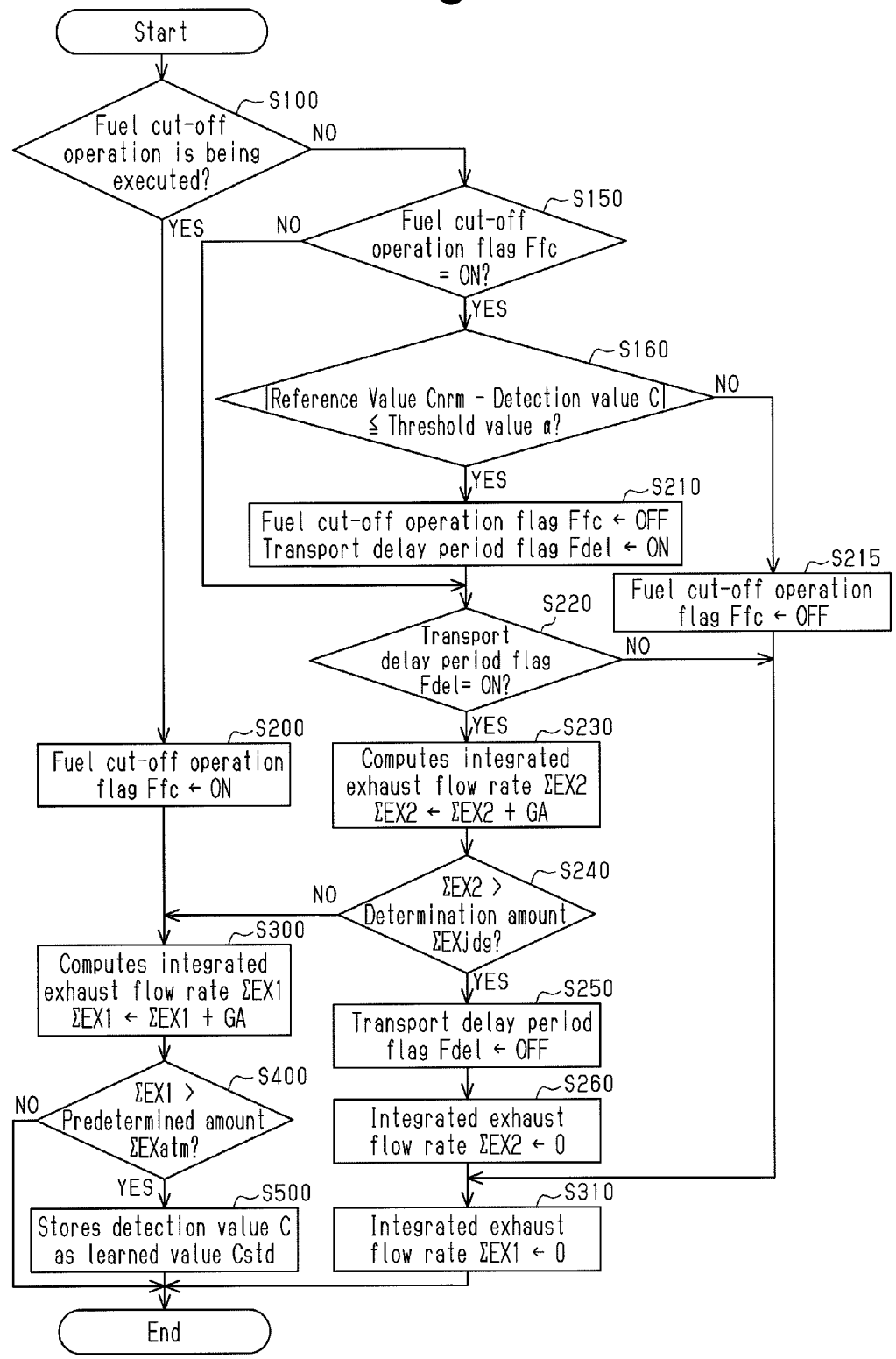
FIG. 4 is a flowchart showing a series of steps of a learning process according to a modified embodiment.

More specifically, steps S160 and S215 may be added to the learning process according to the first embodiment as shown in FIG. 4. With this configuration, when the fuel cut-off operation flag Ffc is set to ON (step S150: YES), that is, when it is immediately after termination of the fuel cut-off operation, the electronic control unit 50 proceeds to step S160, and determines whether the absolute value of the difference between the current detection value C and the reference value Cnrm is less than or equal to a threshold value α. If the absolute value of the difference between the detection value C and the reference value Cnrm is less than or equal to the threshold value α (step S160: YES), that is, if the deviation between the detection value C and the reference value Cnrm is small, the electronic control unit 50 proceeds to step S210 as in the first embodiment. If the absolute value of the difference between the detection value C and the reference value Cnrm is greater than the threshold value α (step S160: NO), that is, if the deviation between the detection value C and the reference value Cnrm is great, the electronic control unit 50 proceeds to step S215 to set the fuel cut-off operation flag Ffc to OFF. After that, the electronic control unit 50 proceeds to step S310. More specifically, as shown in FIG. 3, if the deviation between the detection value C3 of the oxygen concentration sensor 55 and the reference value Cnrm is greater than the threshold value α at the time when the fuel cut-off operation is terminated at time t3, the electronic control unit 50 ends the routine without determining whether the predetermined time period set based on the transport delay has elapsed. That is, the electronic control unit 50 prohibits the learning process that is based on the determination that the ambient air in the vicinity of the oxygen concentration sensor 55 is equal to the atmospheric state.

With this configuration, the following advantage is obtained in addition to the advantage of the first embodiment.

(2) Even if the oxygen concentration sensor 55 has the standard output property, responsiveness might significantly decrease due to, for example, temperature decrease of the sensor element, and the output property of the oxygen concentration sensor 55 might temporarily differ from the standard output property. The learned value Cstd obtained under such circumstance has low reliability, and the correction precision of the detection value C based on the learned value Cstd is also reduced.

In this respect, with the above configuration, if the deviation between the reference value Cnrm and the detection value C3 of the oxygen concentration sensor 55 at the termination of the fuel cut-off operation is great as shown in FIG. 3, the electronic control unit 50 determines that the output property of the oxygen concentration sensor 55 is temporarily varied due to some factors, and prohibits the learning process. Thus, the detection value C of the oxygen concentration sensor 55 is prevented from being corrected based on the learned value Cstd of low reliability.

Also, if the ambient air in the vicinity of the oxygen concentration sensor 55 has not approached the atmospheric state by a certain amount when the fuel cut-off operation is terminated, the electronic control unit 50 cannot complete the learning process within the time period corresponding to the exhaust gas transport delay that is before the fuel reaches the oxygen concentration sensor 55, even if the learning process is continued after the termination of the fuel cut-off operation. Thus, if the integrated exhaust flow rate ΣEX1 at the termination of the fuel cut-off operation is less than a predetermined reference value that is less than a predetermined amount EXatm, the electronic control unit 50 may prohibit the subsequent learning process.

With this configuration, the following advantage is obtained in addition to the advantage of the first embodiment.

(3) The learning process may be prohibited if the integrated exhaust flow rate ΣEX1 from when the fuel cut-off operation is started to when the fuel cut-off operation is terminated is less than the predetermined reference value, and it may be determined at the time when the fuel cut-off operation is terminated whether the learning can be completed by continuing the subsequent learning process. The learning process is thus executed in accordance with the possibility.

The reference value for determining, at the termination of the fuel cut-off operation, whether the learning can be completed by continuing the subsequent learning process is preferably set in accordance with the length and shape of the exhaust passage from the combustion chambers to the oxygen concentration sensor 55, or the cross-sectional area of the passage.

Furthermore, in the first embodiment, the electronic control unit 50 determines that the predetermined time period based on the exhaust gas transport delay has elapsed based on the fact that the integrated exhaust flow rate ΣEX2 from the termination of the fuel cut-off operation is greater than the determination amount ΣEXjdg. In contrast, specific means for determining whether the predetermined time period based on the exhaust gas transport delay has elapsed may be changed as required. For example, it may be determined that the predetermined time period based on the exhaust gas transport delay has elapsed when the time period counted by timer means, which counts time from the termination of the fuel cut-off operation, is greater than or equal to a predetermined time period. However, the length of time period corresponding to the exhaust gas transport delay changes in accordance with the change in the flow rate of exhaust gas. Thus, the threshold value needs to be changed in accordance with the change in the flow rate of exhaust gas to determine that the predetermined time period has elapsed based on the time counted by the timer means. In this respect, if determination is performed based on the integrated exhaust flow rate ΣEX2 as in the first embodiment, the electronic control unit 50 can determine whether the predetermined time period has elapsed based on the previously set determination amount ΣEXjdg.

Similarly, means for determining that the ambient air in the vicinity of the oxygen concentration sensor 55 is equal to the atmospheric state may be changed as required. For example, the ambient air in the vicinity of the oxygen concentration sensor may be determined to be equal to the atmospheric state when the time counted by the timer means, which counts the time from when the fuel cut-off operation is started to when the predetermined time period based on the exhaust gas transport delay has elapsed after the termination of the fuel cut-off operation, becomes greater than or equal to a predetermined time period.

However, in this case, the time taken for the ambient air in the vicinity of the oxygen concentration sensor 55 to become equal to the atmospheric state also changes due to the change in the flow rate of exhaust gas. Thus, the threshold value needs to be changed as required in accordance with the change in the flow rate of exhaust gas to determine whether it is the atmospheric state based on the time counted by the timer means. In this respect, if the determination is made based on the integrated exhaust flow rate ΣEX1 as in the first embodiment, it can be determined whether the ambient air in the vicinity of the oxygen concentration sensor 55 is equal to the atmospheric state based on the previously set predetermined amount ΣEXatm.

Second Embodiment

Figure 5:
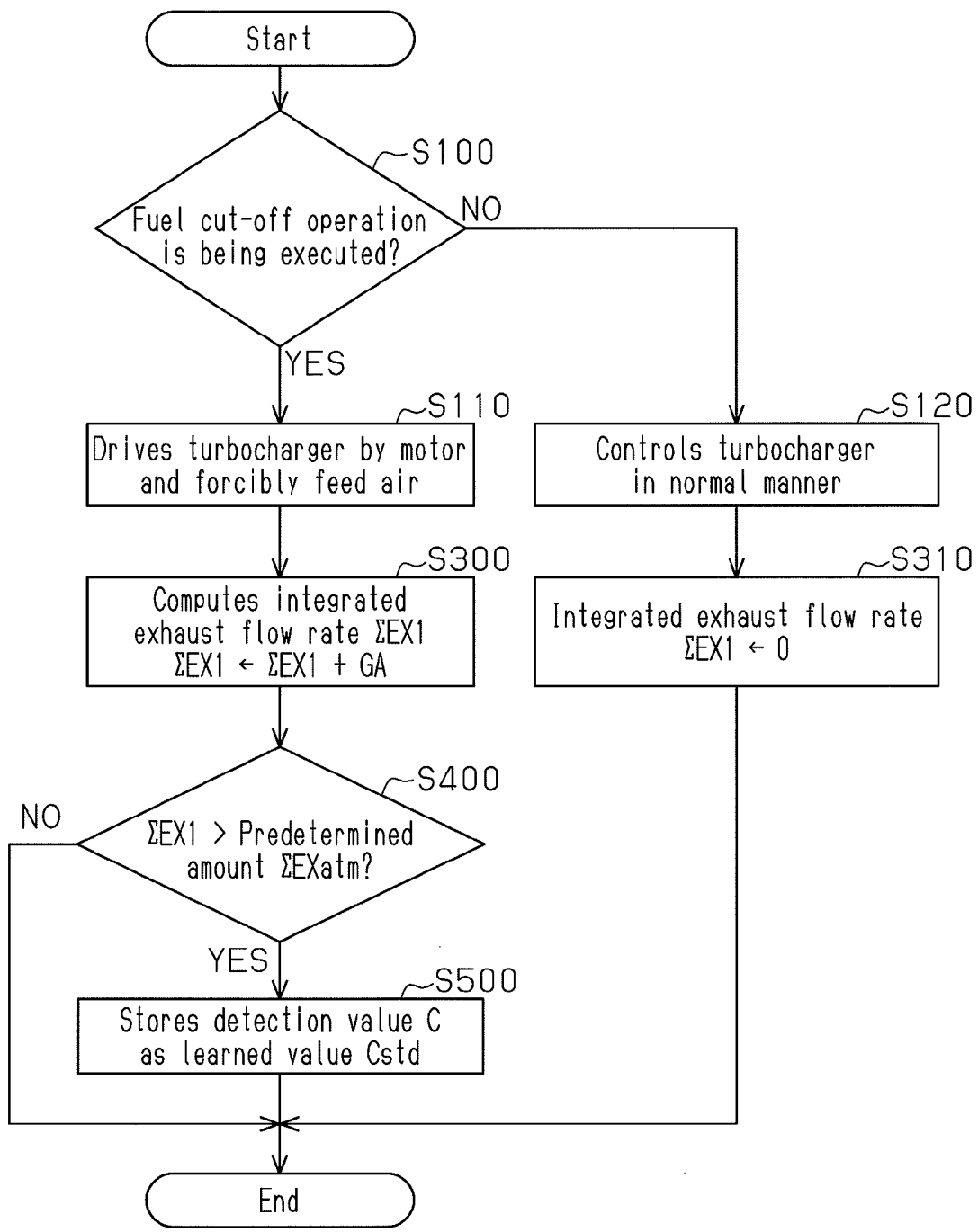
FIG. 5 is a flowchart showing a series of steps of a learning process according to a second embodiment of the present invention.

An engine controller according to a second embodiment of the present invention will now be described with reference to FIGS. 1, 5, and 6. The controller of the second embodiment is applied to a diesel engine. The structure of the diesel engine according to the present embodiment differs from the structure of the diesel engine according to the first embodiment in only part of the structure of the turbocharger 22. Thus, like members are given like numbers and detailed explanations are omitted.

As shown by the chain double-dashed line in FIG. 1, the turbocharger 22 includes a motor 22b, which drives a turbine 22a. The electronic control unit 50 controls drive force of the motor 22b in accordance with the engine operating condition detected by the various types of sensors 51 to 55. The drive force of the motor 22b assists rotation of the turbine 22a and inhibits deterioration of the supercharging efficiency even in a low engine speed range, where the flow rate of exhaust gas is low.

Like the first embodiment, the electronic control unit 50 determines that the ambient air in the vicinity of the oxygen concentration sensor 55 is approaching the atmospheric state as the fuel cut-off operation is executed, and executes the learning process in which the detection value C of the oxygen concentration sensor 55 at the time is stored as the learned value Cstd in the memory 56. Thereafter, the electronic control unit 50 corrects the detection value C of the oxygen concentration sensor 55 based on the learned value Cstd.

The learning process of the present embodiment will now be described with reference to FIGS. 5 and 6. Like or the same reference numerals are given to those steps that are like or the same as the corresponding steps of the first embodiment, and detailed explanations are omitted.

The electronic control unit 50 repeatedly executes the process at a predetermined cycle during operation of the engine. When the process is started, the electronic control unit 50 first determines whether the fuel cut-off operation is being executed at step S100. If the fuel cut-off operation is being executed (step S100: YES), the electronic control unit 50 proceeds to step S110, and drives the motor 22b regardless of the engine operating condition to forcibly rotate the turbine 22a such that air is forcibly fed to the exhaust passage 30.

The electronic control unit 50 then proceeds to step S300, and computes the integrated exhaust flow rate ΣEX1 based on the intake air amount GA as in the first embodiment. After computing the integrated exhaust flow rate ΣEX1, the electronic control unit 50 proceeds to step S400, and determines whether the integrated exhaust flow rate ΣEX1 is greater than the predetermined amount ΣEXatm. Based on the fact that the integrated exhaust flow rate ΣEX1 is greater than the predetermined amount ΣEXatm, the electronic control unit 50 determines that the time period from when the fuel cut-off operation is started to when the fuel cut-off operation is terminated is greater than or equal to the predetermined time period, and the ambient air in the vicinity of the oxygen concentration sensor 55 has become equal to the atmospheric state. The predetermined amount ΣEXatm is set taking into consideration the length and shape of the exhaust passage 30 from the combustion chambers 11 to the oxygen concentration sensor 55, or the cross-sectional area of the passage.

If the integrated exhaust flow rate ΣEX1 is greater than the predetermined amount ΣEXatm (step S400: YES), that is, if the time period from when the fuel cut-off operation is started to when the fuel cut-off operation is terminated is greater than or equal to the predetermined time period, and the ambient air in the vicinity of the oxygen concentration sensor 55 has become equal to the atmospheric state, the electronic control unit 50 proceeds to step S500, and stores the current detection value C of the oxygen concentration sensor 55 as a new learned value Cstd in the memory 56. The electronic control unit 50 then temporarily suspends the routine.

If the integrated exhaust flow rate ΣEX1 is less than or equal to the predetermined amount ΣEXatm (step S400: NO), that is, if the time period from when the fuel cut-off operation is started to when the fuel cut-off operation is terminated is less than the predetermined time period, and the ambient air in the vicinity of the oxygen concentration sensor 55 has not yet become equal to the atmospheric state, the electronic control unit 50 skips step S500, and temporarily suspends the routine.

If the fuel cut-off operation is not being executed (step S100: NO), the electronic control unit 50 proceeds to step S120, and actuates the motor 22*b* in accordance with the engine operating condition without forcibly feeding the air as described above, and controls the turbocharger 22 in a normal manner. The electronic control unit 50 proceeds to step S310, and resets the integrated exhaust flow rate ΣEX1 to 0, and temporarily suspends the routine.

According to the present embodiment, by repeatedly executing the above learning process during operation of the engine, the electronic control unit 50 stores, as the learned value Cstd in the memory 56, the detection value C of the oxygen concentration sensor 55 when the ambient air in the vicinity of the oxygen concentration sensor 55 is determined to be equal to the atmospheric state based on the fact that the integrated exhaust flow rate ΣEX1 is greater than the predetermined amount ΣEXatm. Thereafter, the electronic control unit 50 corrects the detection value C of the oxygen concentration sensor 55 based on the learned value Cstd.

The operation of the learning process will now be described with reference to FIG. 6.

Figure 6:
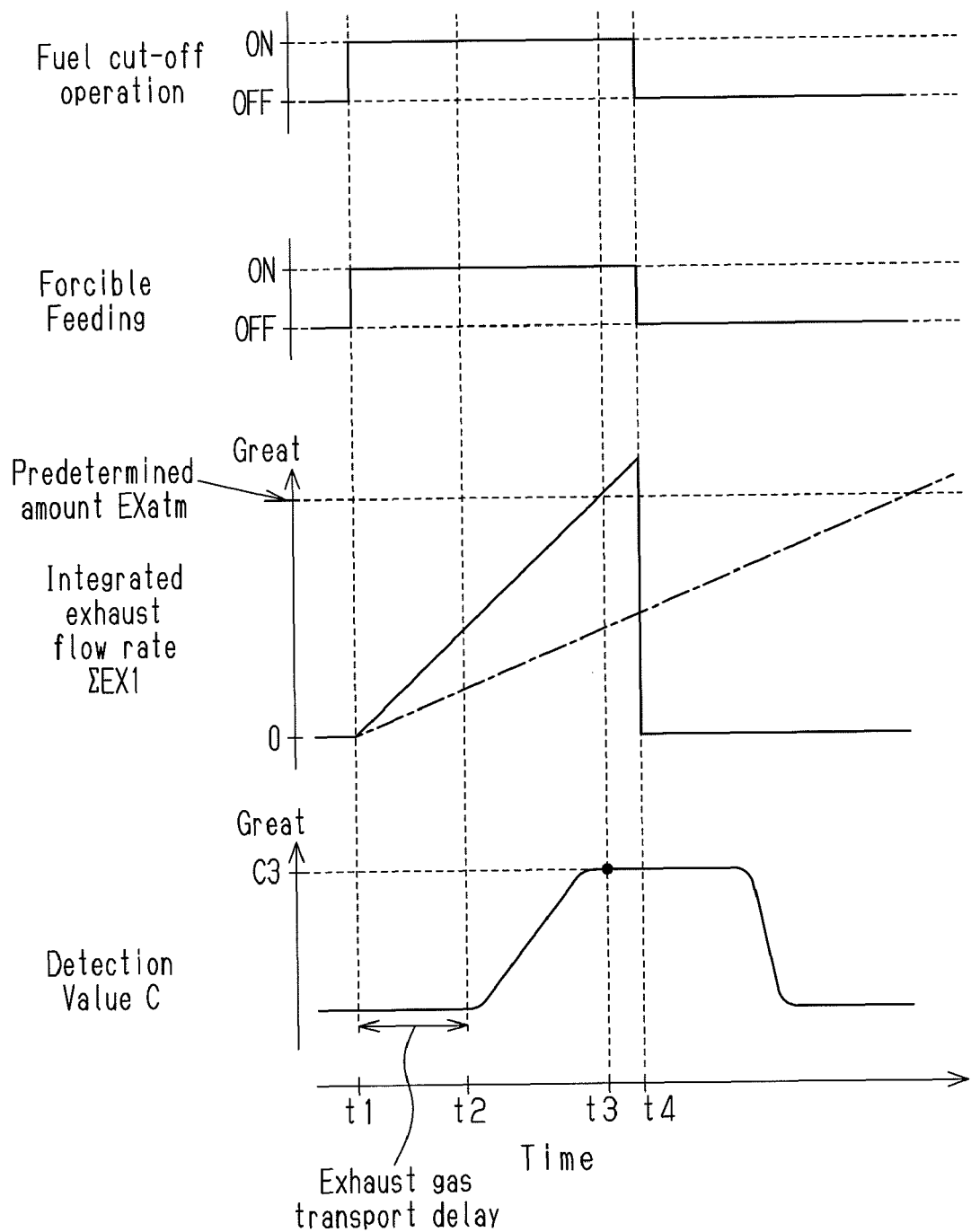
FIG. 6 is a timing chart showing the relationship between the time at which the learned value is acquired and the time at which the fuel cut-off operation is terminated in the learning process.

As shown in FIG. 6, when the fuel cut-off operation is executed at time t1, the motor 22*b* forcibly drives the turbine 22*a* of the turbocharger 22 so that air is forcibly fed to the exhaust passage 30. In addition, the electronic control unit 50 starts computing the integrated exhaust flow rate ΣEX1 based on the intake air amount GA. The air introduced into the combustion chambers 11 by the execution of the fuel cut-off operation is forcibly fed unchanged to the exhaust passage 30 as it is. Thus, the oxygen concentration in the vicinity of the oxygen concentration sensor 55 approaches the oxygen concentration of the atmospheric air. Thus, the detection value C of the oxygen concentration sensor 55 is increased as the fuel cut-off operation is continued. However, during the time period corresponding to the exhaust gas transport delay from time t1 to time t2, air that is forcibly fed to the exhaust passage 30 does not reach the vicinity of the oxygen concentration sensor 55 as shown in FIG. 6. Thus, since the gas that is burned before the fuel cut-off operation is started is flowing in the vicinity of the oxygen concentration sensor 55, the detection value C of the oxygen concentration sensor 55 is kept at a low value. Since the air that is forcibly fed to the exhaust passage 30 reaches the vicinity of the oxygen concentration sensor 55 after time t2, that is, after the time period corresponding to the exhaust gas transport delay has elapsed, the detection value C of the oxygen concentration sensor 55 starts increasing rapidly.

Meanwhile, computation of the integrated exhaust flow rate ΣEX1 is continued. Thus, the value of the integrated exhaust flow rate ΣEX1 is increased as the fuel cut-off operation is continued. Since the amount of air that is greater than normal is fed to the exhaust passage 30 while the turbocharger 22 is forcibly driven, the intake air amount GA is also increased. Thus, the integrated exhaust flow rate ΣEX1 computed based on the intake air amount GA is rapidly increased as compared to the conventional case in which air is not forcibly fed as shown by the dashed line in FIG. 6.

If the integrated exhaust flow rate ΣEX1 becomes greater than the predetermined amount ΣEXatm at time t3, the electronic control unit 50 determines that the oxygen concentration of the ambient air in the vicinity of the oxygen concentration sensor 55 has become equal to the atmospheric state, and stores the detection value C3 at this time as the learned value Cstd in the memory 56.

When the fuel cut-off operation is terminated at time t4, forcible feeding of air by the motor 22*b* is stopped, and the turbocharger 22 is controlled in the normal manner. In addition, the electronic control unit 50 resets the integrated exhaust flow rate ΣEX1 to 0, and ends the learning process.

The second embodiment has the following advantage.

(4) During execution of the fuel cut-off operation, the turbocharger 22 is forcibly driven by the motor 22*b* so that air is forcibly fed to the exhaust passage 30. Accordingly, the amount of air that flows in the exhaust passage 30 is increased. This shortens the time taken for the ambient air in the vicinity of the oxygen concentration sensor 55 to become equal to the atmospheric state. Thus, since chances for obtaining the learned value in the learning process are increased, deterioration of the exhaust gas property by variation of the detection value C of the oxygen concentration sensor 55 is inhibited.

The second embodiment may be modified as follows.

In the second embodiment, the electronic control unit 50 determines that the time period from when the fuel cut-off operation is started to when the fuel cut-off operation is terminated is greater than or equal to the predetermined time period, and the ambient air in the vicinity of the oxygen concentration sensor 55 is equal to the atmospheric state based on the fact that the integrated exhaust flow rate ΣEX1 from when the fuel cut-off operation is started has become greater than the predetermined amount ΣEXatm. In contrast, the electronic control unit 50 may determine that the ambient air in the vicinity of the oxygen concentration sensor is equal to the atmospheric state when the time counted by the timer means, which counts time from when the fuel cut-off operation is started to when the fuel cut-off operation is terminated, has become greater than or equal to a determination time period.

However, in this case, time taken for the ambient air in the vicinity of the oxygen concentration sensor 55 to become equal to the atmospheric state changes by variation of the flow rate of exhaust gas. Thus, the threshold value needs to be changed as required in accordance with the change in the flow rate of exhaust gas to determine whether it is the atmospheric state based on the time counted by the timer means. In this respect, the electronic control unit 50 can determine whether it has become the atmospheric state based on the previously set predetermined amount ΣEXatm by making determination based on the integrated exhaust flow rate ΣEX1 as in the second embodiment.

Third Embodiment

Figure 7:
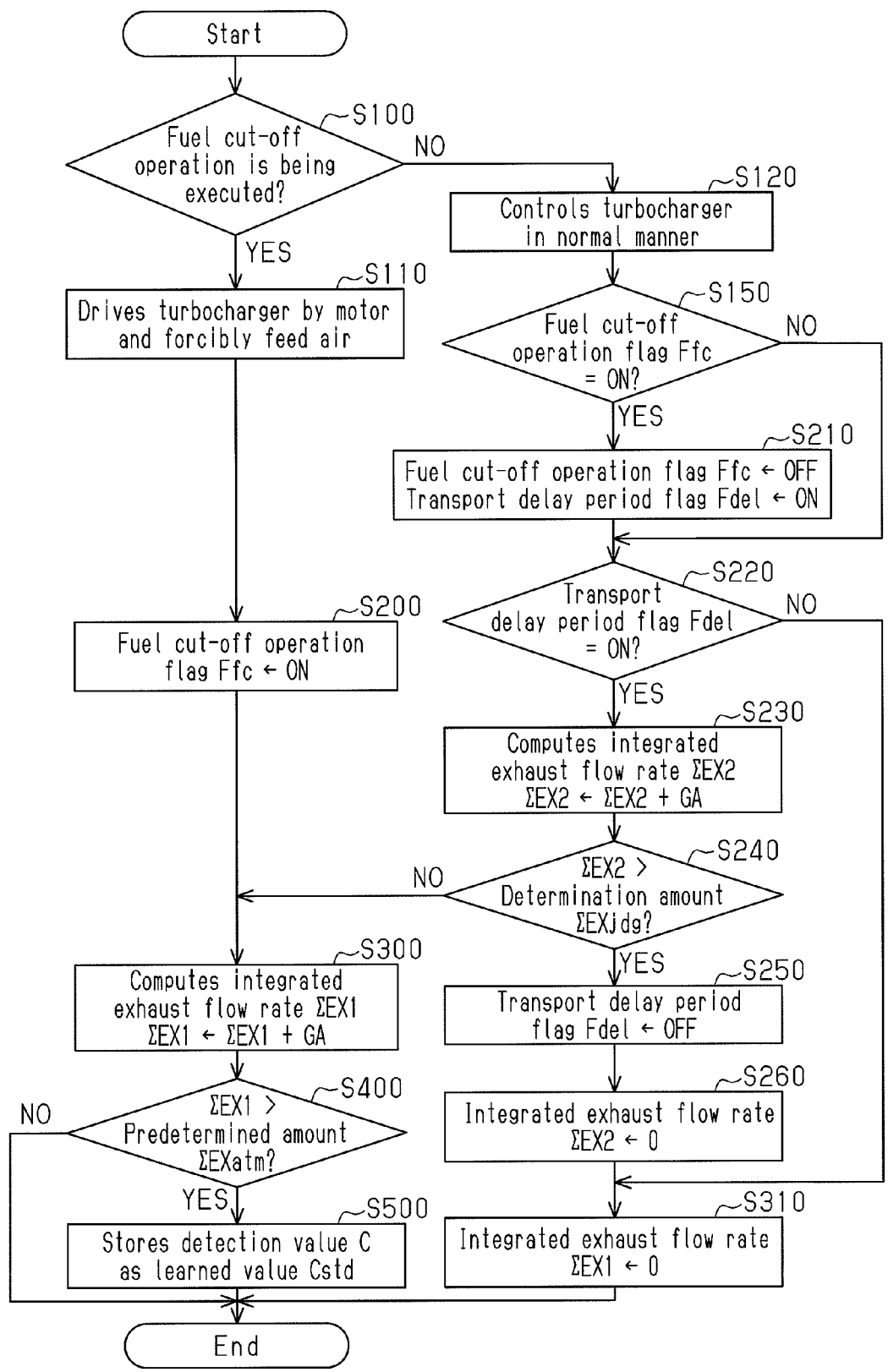
FIG. 7 is a flowchart showing a series of steps of a learning process according to a third embodiment of the present invention.

An engine controller according to a third embodiment of the present invention will now be described with reference to FIGS. 7 and 8. The controller of the third embodiment is applied to a diesel engine. The third embodiment is a combination of the first embodiment and the second embodiment. Since the structure of the diesel engine according to the third embodiment is the same as that of the second embodiment, like or the same reference numerals are given to the components of the diesel engine, and detailed explanation is omitted.

Learning process of the oxygen concentration sensor 55 will now be described with reference to FIG. 7. In the learning process according to the present embodiment, the process of the second embodiment in which the turbocharger 22 is forcibly driven by the motor 22b during the fuel cut-off operation is added to the learning process of the first embodiment. Thus, the same reference numerals are given to those steps that are the same as the steps of the first and second embodiments, and detailed explanations are omitted.

A series of steps of the learning process according to the present embodiment will now be described with reference to the flowchart shown in FIG. 7. The electronic control unit 50 repeatedly executes the process at a predetermined cycle during operation of the engine. When the process is started, the electronic control unit 50 first determines whether the fuel cut-off operation is being executed at step S100. If the fuel cut-off operation is being executed (step S100: YES), the electronic control unit 50 proceeds to step S110, and drives the motor 22b regardless of the engine operating condition so that the turbine 22a is forcibly rotated and air is forcibly fed to the exhaust passage 30.

The electronic control unit 50 then proceeds to step S200, and sets the fuel cut-off operation flag Ffc to ON. The electronic control unit 50 proceeds to step S300, and computes the integrated exhaust flow rate ΣEX1 from when the fuel cut-off operation is started based on the intake air amount GA.

After computing the integrated exhaust flow rate ΣEX1, the electronic control unit 50 proceeds to step S400, and determines whether the integrated exhaust flow rate ΣEX1 is greater than the predetermined amount ΣEXatm. The electronic control unit 50 determines that the ambient air in the vicinity of the oxygen concentration sensor 55 is equal to the atmospheric state based on the fact that the integrated exhaust flow rate ΣEX1 is greater than the predetermined amount ΣEXatm. The predetermined amount ΣEXatm is set taking into consideration the length and shape of the exhaust passage 30 from the combustion chambers 11 to the oxygen concentration sensor 55, or the cross-sectional area of the passage.

If the integrated exhaust flow rate ΣEX1 is greater than the predetermined amount ΣEXatm (step S400: YES), that is, when the ambient air in the vicinity of the oxygen concentration sensor 55 is equal to the atmospheric state, the electronic control unit 50 proceeds to step S500, and stores the current detection value C of the oxygen concentration sensor 55 as a new learned value Cstd in the memory 56, and temporarily suspends the routine.

If the integrated exhaust flow rate ΣEX1 is less than or equal to the predetermined amount ΣEXatm (step S400: NO), that is, if the ambient air in the vicinity of the oxygen concentration sensor 55 has not become equal to the atmospheric state, the electronic control unit 50 skips step S500, and temporarily suspends the routine.

If the fuel cut-off operation is not being executed (step S100: NO), the electronic control unit 50 proceeds to step S120, and drives the motor 22b in accordance with the engine operating condition without forcibly feeding air, and controls the turbocharger 22 in the normal manner.

The electronic control unit 50 then proceeds to step S150, and determines whether the fuel cut-off operation flag Ffc is set to ON. If the fuel cut-off operation flag Ffc is ON (step S150: YES), that is, if it is presumed that the fuel cut-off operation has just terminated, the electronic control unit 50 proceeds to step S210, and sets the fuel cut-off operation flag Ffc to OFF and the transport delay period flag Fdel to ON, and then proceeds to step S220.

If the fuel cut-off operation flag Ffc is OFF (step S150: NO), that is, if it is presumed that the normal fuel injection control is being continued, the electronic control unit 50 skips step S210 and proceeds to step S220, and determines whether the transport delay period flag Fdel is ON. If the transport delay period flag Fdel is ON (step S220: YES), that is, if it is presumed to be during the predetermined time period based on the exhaust gas transport delay, the electronic control unit 50 proceeds to step S230, and computes the integrated exhaust flow rate ΣEX2 from the termination of the fuel cut-off operation based on the intake air amount GA.

After computing the integrated exhaust flow rate ΣEX2, the electronic control unit 50 proceeds to step S240, and determines whether the integrated exhaust flow rate ΣEX2 is greater than the determination amount ΣEXjdg. The determination amount ΣEXjdg is a value for determining the length of the predetermined time period based on the exhaust gas transport delay. The electronic control unit 50 determines that the predetermined time period based on the exhaust gas transport delay has elapsed based on the fact that the integrated exhaust flow rate ΣEX2 is greater than the determination amount ΣEXjdg at step S240. The determination amount ΣEXjdg is set taking into consideration the length and shape of the exhaust passage 30 from the combustion chambers 11 to the oxygen concentration sensor 55, or the cross-sectional area of the passage such that the predetermined time period is slightly shorter than the time period corresponding to the actual exhaust gas transport delay.

If the integrated exhaust flow rate ΣEX2 is less than or equal to the determination amount ΣEXjdg (step S240: NO), that is, if the predetermined time period based on the exhaust gas transport delay has not elapsed, the electronic control unit 50 proceeds to step S300, and computes the integrated exhaust flow rate ΣEX1. Subsequently, the electronic control unit 50 proceeds to step S400, and determines whether the integrated exhaust flow rate ΣEX1 is greater than the predetermined amount ΣEXatm. If the integrated exhaust flow rate ΣEX1 is greater than the predetermined amount ΣEXatm (step S400: YES), the electronic control unit 50 proceeds to step S500, and stores the detection value C of the oxygen concentration sensor 55 as the learned value Cstd in the memory 56, and temporarily suspends the routine. If the integrated exhaust flow rate ΣEX1 is still less than or equal to the predetermined amount ΣEXatm (step S400: NO), the electronic control unit 50 skips step S500, and temporarily suspends the routine.

Also, if the integrated exhaust flow rate ΣEX2 is greater than the determination amount ΣEXjdg (step S240: YES), that is, if the predetermined time period based on the transport delay has elapsed, the electronic control unit 50 proceeds to step S250, and sets the transport delay period flag Fdel to OFF. Then, the electronic control unit 50 proceeds to step S260, and resets the integrated exhaust flow rate ΣEX2 to 0. Then, the electronic control unit 50 proceeds to step 310, and resets the value of the integrated exhaust flow rate ΣEX1 to 0, and temporarily suspends the routine.

Also, if the transport delay period flag Fdel is OFF (step S220: NO), that is, if the predetermined time period based on the exhaust gas transport delay has elapsed from the termination of the fuel cut-off operation, the electronic control unit 50 proceeds to step S310, and resets the integrated exhaust flow rate ΣEX1 to 0, and temporarily suspends the routine.

According to the present embodiment, the electronic control unit 50 stores the detection value C of the oxygen concentration sensor 55 at the time when the ambient air in the vicinity of the oxygen concentration sensor 55 is equal to the atmospheric state as the learned value Cstd in the memory 56 by repeatedly executing the learning process during operation of the engine. Thereafter, the electronic control unit 50 corrects the detection value C of the oxygen concentration sensor 55 based on the learned value Cstd.

The operation of the learning process will now be described with reference to FIG. 8.

Figure 8:
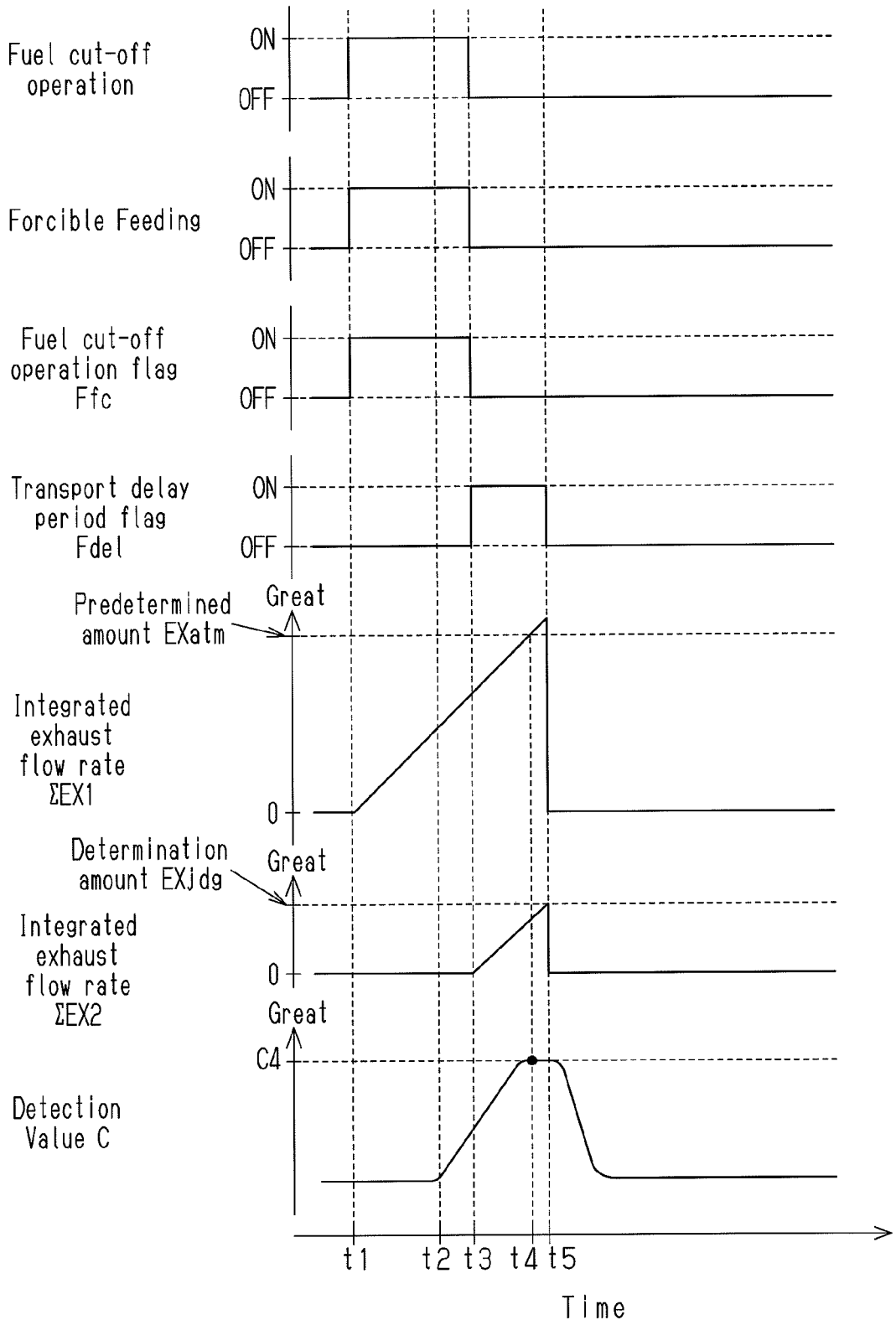
FIG. 8 is a timing chart showing the relationship between the time at which the learned value is acquired and the time at which the fuel cut-off operation is terminated in the learning process.
Figure 9:
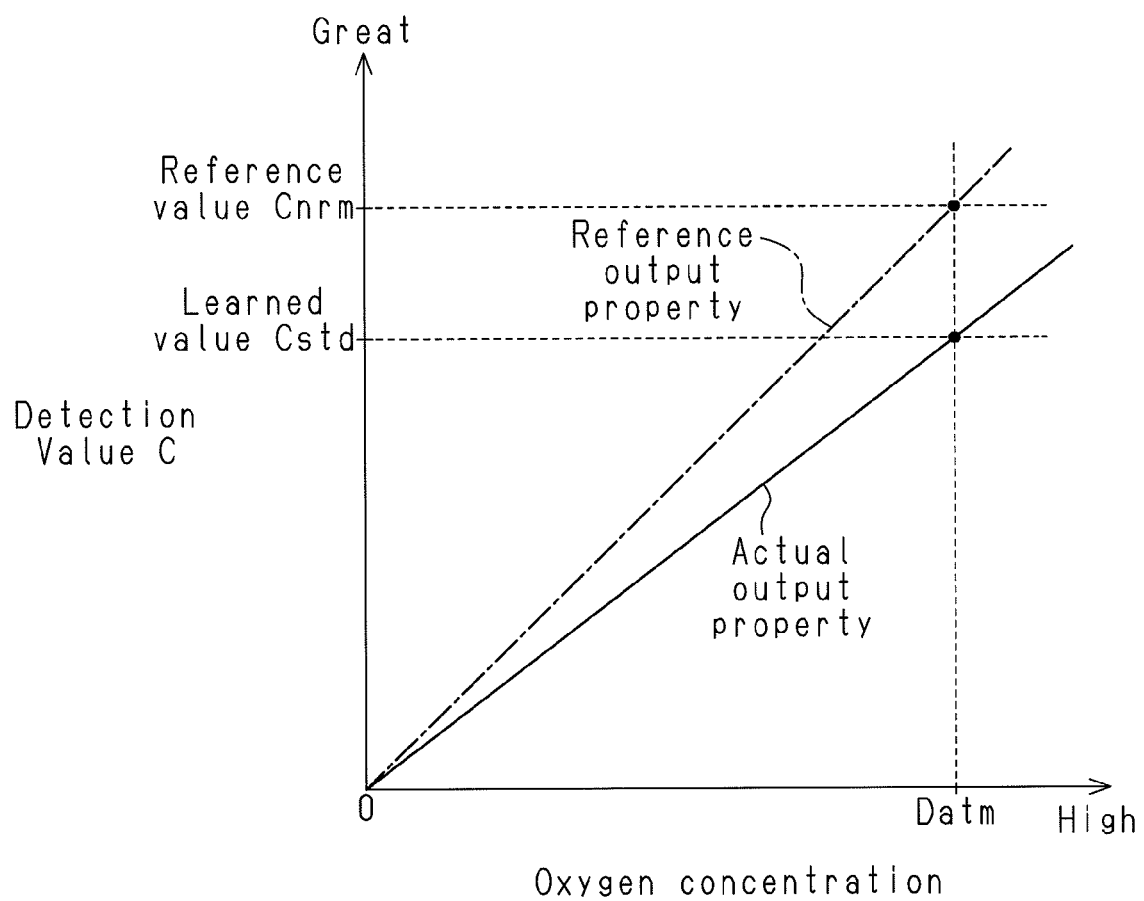
FIG. 9 is a graph showing the output property of a typical oxygen concentration sensor.

As shown in FIG. 8, when the fuel cut-off operation is executed at time t1, the motor 22b is actuated to forcibly rotate the turbine 22a so that air is forcibly fed to the exhaust passage 30. In addition, the electronic control unit 50 sets the fuel cut-off operation flag Ffc to ON, and starts computing the integrated exhaust flow rate ΣEX1.

After the time period corresponding to the exhaust gas transport delay has elapsed at time t2, the air that is introduced into the combustion chambers 11 and then forcibly fed to the exhaust passage 30 reaches the vicinity of the oxygen concentration sensor 55 without being changed. Thus, the detection value C of the oxygen concentration sensor 55 starts increasing rapidly. Meanwhile, computation of the integrated exhaust flow rate ΣEX1 is continued. Thus, the value of the integrated exhaust flow rate ΣEX1 is increased as the fuel cut-off operation is continued.

If the fuel cut-off operation is terminated at time t3, since the actuation of the motor 22b is stopped, and forcible feeding of air is stopped, the turbocharger 22 is controlled in the normal manner. In addition, the electronic control unit 50 sets the fuel cut-off operation flag Ffc to OFF and the transport delay period flag Fdel to ON, and starts computing the integrated exhaust flow rate ΣEX2.

If the integrated exhaust flow rate ΣEX1 becomes greater than the predetermined amount ΣEXatm at time t4, the electronic control unit 50 determines that the ambient air in the vicinity of the oxygen concentration sensor 55 has become equal to the atmospheric state, and stores the current detection value C4 as the learned value Cstd in the memory 56.

According to the present embodiment, the turbocharger 22 is driven by the motor 22b during the fuel cut-off operation (from time t1 to t3) as shown in FIG. 8 so that air is forcibly fed to the exhaust passage 30. The learning process is continued during the time period from the termination of the fuel cut-off operation (time t3) to when the integrated exhaust flow rate ΣEX2 becomes greater than the determination amount ΣEXjdg (time t5), that is, during the time period from the termination of the fuel cut-off operation to when the predetermined time period based on the exhaust gas transport delay elapses. Then, the electronic control unit 50 stores the detection value C of the oxygen concentration sensor 55 as the learned value Cstd when the integrated exhaust flow rate ΣEX1 becomes greater than the predetermined amount ΣEXatm during the determination time period from time t1, at which the fuel cut-off operation is started, to time t5, at which the integrated exhaust flow rate ΣEX2 becomes greater than the determination amount ΣEXjdg.

The third embodiment has the following advantage.

(5) During execution of the fuel cut-off operation, since the motor 22b drives the turbocharger 22 so as to forcibly feed air to the exhaust passage 30, the amount of air that flows in the exhaust passage 30 is increased. This shortens the time taken for the ambient air in the vicinity of the oxygen concentration sensor 55 to become equal to the atmospheric state. Thus, chances for obtaining the learned value in the learning process are increased as compared to the first embodiment. This further inhibits deterioration of the exhaust gas property by variation of the detection value of the oxygen concentration sensor 55.

The third embodiment may be modified as follows.

As in the first embodiment, if the deviation between the detection value C of the oxygen concentration sensor 55 and the reference value Cnrm at the termination of the fuel cut-off operation is great, the electronic control unit 50 may prohibit execution of the learning process based on the fact that the predetermined time period based on the exhaust gas transport delay has elapsed.

In this case, step S160 may be added between step S150 and step S210. If the deviation between the detection value C and the reference value Cnrm is great at step S160, the electronic control unit 50 may proceed to step S215, and prohibit the learning process.

The first to third embodiments may be modified as follows.

In the first to third embodiments, the oxygen concentration sensor 55 is a limiting current sensor, but may be any sensor that outputs different detection values in accordance with the oxygen concentration.

In the first to third embodiments, the present invention is applied to the diesel engine controller that controls the EGR mechanism 33 based on the detection value C of the oxygen concentration sensor, but may be applied to a gasoline engine that executes air-fuel ratio feedback control based on the detection value C of the oxygen concentration sensor 55.

The invention claimed is:

1. An engine controller comprising an oxygen concentration sensor, which is located in an exhaust passage and detects oxygen concentration of exhaust gas, and learning means, which executes a learning process, the learning process including:
   a determining process in which when an integrated exhaust flow rate from when a fuel cut-off operation is started becomes greater than a predetermined amount, the learning means determines that ambient air in a vicinity of the oxygen concentration sensor in the exhaust passage has become atmospheric state equal to the oxygen concentration of atmospheric air as a fuel cut-off operation is executed; and
   a storing process in which a detection value of the oxygen concentration sensor at the time when the ambient air in the vicinity of the oxygen concentration sensor is determined to be equal to the atmospheric state is stored as a learned value,
   wherein the learning means corrects a detection value of the oxygen concentration sensor based on the learned value,
   wherein the learning means continues the learning process until a predetermined time period set based on an exhaust gas transport delay elapses from when the fuel cut-off operation is terminated.

2. The engine controller according to claim 1, wherein when deviation between a reference value, which is previously set as an output value of the oxygen concentration sensor at the time when the ambient air in the vicinity of the oxygen concentration sensor is equal to the atmospheric state, and an output value of the oxygen concentration sensor when the fuel cut-off operation is terminated is great, the learning means prohibits the learning process, which is executed based on the determination that the ambient air in the vicinity of the oxygen concentration sensor is equal to the atmospheric state during the predetermined time period.

3. The engine controller according to claim 1, wherein when an integrated exhaust flow rate from when the fuel cut-off operation is terminated becomes greater than a determination amount, the learning means determines that the predetermined time period based on the exhaust gas transport delay has elapsed.

4. The engine controller according to claim 1, wherein when the integrated exhaust flow rate from when the fuel cut-off operation is started to when the fuel cut-off operation is terminated is less than a predetermined reference amount, the learning means prohibits the learning process.

5. The engine controller according to claim 1, wherein the engine includes a motor assisted turbocharger, which is selectively driven by a motor, wherein the motor assisted turbocharger is driven by the motor during execution of the fuel cut-off operation so that air is forcibly fed to the exhaust passage.

* * * * *